INVENTOR.
ROBERT C. WRIGHT, JR.
BY
*Blair Buckles + Cesari*
ATTORNEYS

United States Patent Office 3,424,230
Patented Jan. 28, 1969

---

3,424,230
CRYOGENIC REFRIGERATION DEVICE WITH TEMPERATURE CONTROLLED DIFFUSER
Robert C. Wright, Jr., Hingham, Mass., assignor to Andonian Associates, Inc., Waltham, Mass.
Filed Dec. 19, 1966, Ser. No. 602,683
U.S. Cl. 165—2                6 Claims
Int. Cl. F25b *19/00, 29/00;* F25d *25/00*

ABSTRACT OF THE DISCLOSURE

A device for cooling or continuously regulating the temperature of a body from below 2° K. to above 300° K. has a thermally insulated chamber for receiving the body, a source of liquid refrigerant and a temperature controlled heat exchanger and diffuser. The refrigerant is evaporated, passed through the heat exchanger and diffuser, where its temperature is regulated, and then flowed over the body.

---

Figure 1:
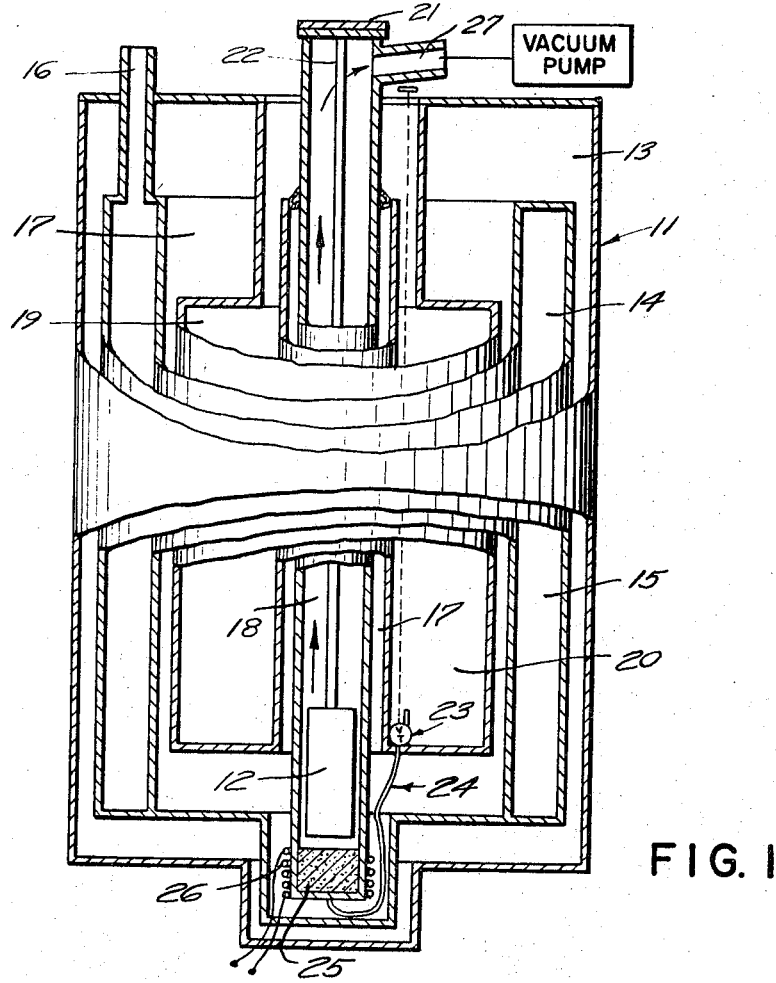

The present invention relates to an apparatus and method for accurately controlling the temperature of a body. More particularly, it relates to an apparatus and method for cooling or regulating the temperature of a body from below 2° K. to over 300° K.

The relatively new science of cryogenics has made it possible to study the character of materials and devices at very low temperatures. For various reasons it is desirable to know such characteristics at low temperatures and to know the variations of characteristics with changes in temperature. This is particularly true with respect to certain materials and devices which exhibit significant behavioral changes at extremely low temperatures. It is therefore important to know and control the temperature of a specimen or body over a range extending from less than 2° K. to over 300° K.

Various techniques have been evolved to control the temperature environment of a body or sample at low to moderate temperatures. These generally involve the use of a Dewar or cryostat containing a refrigerant. Typically, the body is immersed in the refrigerant.

Changing of submerged samples is often complicated because it may require at least partial disassembly of the cryostat. This results in significant losses of refrigerant since the sample chamber is exposed to atmospheric pressure and must be pumped down again to attain a low temperature. When samples are changed frequently, a very high pump capacity is required. This is especially true if very low temperatures are desired. To reduce the temperature of a helium bath below 2° K., the lambda point of helium, about one-third of the helium present must be pumped off. This is because the specific heat of helium at the lambda point is very high. The amount of data required for a given expenditure of time, therefore may be quite small.

Yet another difficulty with such systems is that they are often quite slow in their ability to vary the temperature of the sample since the temperature of the liquid bath must be varied. They are also quite limited in the temperature range over which they can effectively operate since the temperature range of the bath is limited by the liquidus temperature range of the liquid.

In The Review of Scientific Instruments, volume 25, pp. 608–611 (1954) and volume 37, pp. 171 and 172 (1966) a system is proposed for cooling a sample from about 100° K. down to 4° K. It conserves refrigerant by flowing the cold gas over the sample rather than submerging the sample in the liquid refrigerant. Since He gas, for example, has a high specific heat, an appreciable saving of liquid He can be achieved by utilizing the heat capacity of the gas. While the devices described in these articles provide greater economy and flexibility than the liquid bath cooling devices, they do suffer from certain deficiencies. First, the cooling gas flowing out through the exhaust does not have a constant thermal cross-section. This may result in non-uniform cooling of the sample. Second, as mechanized, the range of temperatures over which it is operable is not adequate for certain purposes, viz for cooling to below 20° K. and heating to over 300° K.

It is therefore an object of the present invention to provide an improved apparatus for accurately and uniformly controlling the temperature of a body from below 2° K. to over 300° K. that is economical in its use of refrigerant.

Another object of the present invention is to provide an apparatus for accurately and uniformly controlling the temperature of a body at low and intermediate temperatures which responds quickly to desired temperature changes.

An additional object of the present invention is to provide an apparatus for accurately and uniformly controlling the temperature of a body at low and intermediate temperatures which facilitates removal and replacement of the body from the apparatus without significant loss of refrigerant or time.

A further object of the present invention is to provide an apparatus for accurately and uniformly maintaining the temperature of a body at temperatures below 2° K. with greatly reduced vacuum pumping capacity requirements.

Yet another object of the present invention is to provide an improved method for accurately and uniformly controlling the temperature of a body at low and intermediate temperatures over a broad temperature range with minimal use of refrigerant.

Other objects of the invention will in part be obvious and will in part appear hereinafter.

The invention accordingly comprises the several steps and the relation of one or more such steps with respect to each of the others and the apparatus embodying the features of construction, combination of elements and arrangements of parts which are adapted to effect such steps, all as exemplified in the following detailed disclosure, and the scope of the invention will be indicated in the claims.

Figure 2:
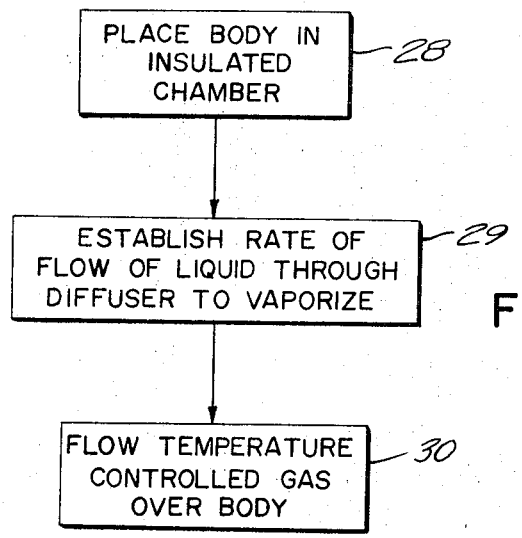

For a fuller understanding of the nature and objects of the invention, reference should be had to the following detailed description taken in connection with the accompanying drawing, in which:

FIGURE 1 illustrates, in cross-section, an embodiment of the apparatus of the present invention; and FIGURE 2 is a flow-chart illustrating the steps in the method of the present invention.

Briefly, my improved apparatus for accurately and uniformly controlling the temperature of a body includes a thermally insulated chamber for receiving the body and a source of liquid refrigerant to serve as a medium for providing a low temperature. A regulated flow of the liquid refrigerant passes into a temperature controlled heat exchanger and diffuser. Flow of the refrigerant is regulated through the heat exchanger and diffuser to permit vaporization of the liquid refrigerant under conditions where the temperature of the exiting gas is carefully controlled. One possible arrangement embodies a combination heat exchanger and diffuser consisting of a porous metal plug through which the refrigerant vapor flows. An electric resistance heater is in intimate thermal contact with the porous plug to provide a controlled flow of heat in heat exchange relation region with the gas, thereby causing the exiting gas to have a uniform thermal cross-section. The temperature controlled gas is then flowed continuously over the body. The maintenance of a uniform thermal cross-section is extremely important. For example certain behavioral changes in materials and devices occur suddenly at very specific temperatures. It is therefore necessary to maintain precise temperature control in the vicinity of these temperatures in order to observe behavioral changes.

Since my apparatus does not require immersion of the body in the liquid it is very economical in the use of the liquid refrigerant. This economy results partly from the fact that no liquid refrigerant is exposed to the atmosphere during either operation or sample changing. I can also use heating coils around the diffuser to control accurately over a broad range the temperature and thermal cross-section of the vapors before they contact the body. This gives me extremely accurate control of the temperature environment of the body. It also enables removal of the body without loss of significant amounts of refrigerant since I can simply shut off the refrigerant supply to the diffuser.

I also provide an improved method of accurately controlling the temperature of a body which includes placing the body in a thermally insulated chamber, establishing a selected rate of flow of a liquid refrigerant through a temperature controlled diffuser, and flowing the exiting temperature controlled gas continuously over the body.

The method enables rapid changing of the temperature environment of the body by heating or cooling the vapor as it flows through the diffuser. If I want to reduce the temperature of the body below the normal boiling point of the refrigerant, I draw a vacuum on the chamber in which the body is disposed. This reduces the boiling point of the refrigerant and thereby reduces the temperature of the gas flowing over the body. To operate at elevated temperatures I pressurize the storage reservoir to provide drive pressure across the throttle valve, I provide a heat input to the heat exchanger diffuser to raise the temperature of the exiting gas to the desired level, and vent the vapors to atmosphere.

FIGURE 1 of the drawings illustrates an embodiment of my apparatus. Here a container 11, similar to a double Dewar is used to provide thermal insulation for the sample or body 12. The container 11 has an outer chamber 13 which is evacuated. Inside the outer chamber 13 is an intermediate chamber 14 which contains a refrigerant 15, such as liquid nitrogen. The refrigerant 15 may be added through the opening 16 in the top of the container.

Within the intermediate chamber 14 is a second vacuum chamber 17. This provides a vacuum jacket for the chamber 18 which contains the sample 12. Within the second vacuum chamber 17 there is an additional chamber 19 which carries a liquid refrigerant 20 that is used to control the temperature of the sample 12. This refrigerant may, for example, be liquid helium.

The sample 12 is supported within the chamber 18 by means of a support 21. As illustrated, the support 21 includes a cap portion for sealing the chamber 18 and a rod portion 22 extending therefrom. The sample 12 is affixed to the base of the rod 22.

The liquid refrigerant 20, which is used to control the temperature of the body 12, is dispensed by means of a throttle valve 23. It then flows from the chamber 19 through a small conduit 24 into a heat exchanger diffuser 25. As the refrigerant 20 passes through the heat exchanger and diffuser 25 it vaporizes. The heat exchanger and diffuser 25 may be composed of sintered porous metal or metallic wool, such as copper wool, which aids in controlling the evaporation rate and vapor flow. More important, the diffuser 25 provides exiting gas with a uniform thermal cross-section. The refrigerant 20 flow may be adjusted so that the body 12 is barely maintained at the lowest desired temperature or the temperature may be elevated above this point by heating the heat exchanger and diffuser 25. This may be accomplished, for example, by the use of a resistance heater 26. The heater 26 may be simply constructed by winding resistance wire around the heat exchanger diffuser 25.

As the refrigerant 20 gas flows by the body 12 it travels up the chamber 18 and passes out of the exhaust 27, as indicated by the arrows.

The flowing vapor column causes the entire environment of the body 12 to assume essentially the same temperature. After the gas flows over the body 12 it absorbs thermal energy that would otherwise flow into the sample along the support rod 22, lead wires and other accessories, not shown, which may contact the body 12. This prevents migration of significant amounts of thermal energy from exterior sources into the body 12.

As the body 12 is inserted into or withdrawn from the chamber 18, the continuous outflow of refrigerant vapor prevents contamination of the chamber 18 by air or frozen moisture. A new body 12, for example, is bathed by the exhaust vapor as it is inserted. This removes any contaminating vapors.

The body 12 and chamber 18 may be operated at any temperature down to the boiling point of the refrigerant 20. To reduce the temperature of the chamber 18 to the boiling point of the liquid 20 the heat exchanger and diffuser 25 is not heated and a flow of refrigerant 20 is maintained at a level which does not permit significant energy absorption in the diffuser 25.

On the other hand, the introduction of electrical power by means of the heater 26 causes a temperature rise. This enables the entire range of temperature from the boiling point of the refrigerant 20 to the temperature limit of the material used in the system to be covered.

Tests conducted using liquid helium as the refrigerant 20 have enabled the maintenance of constant temperatures at any selected point throughout the entire range from 4.2° K., the normal boiling point of helium, to 325° K. Not only have temperatures been maintained at selected values within this range, but stabilities to ±0.25° have been maintained by occasional manual adjustment of electrical power to the heater 26. A heater (not shown) can also be located on the outside of the body 12. Millidegree temperature control has been maintained using this heater in combination with an automatic temperature control system.

In the apparatus of my invention temperature gradients in the chamber 18 were examined by conducting axial and lateral traverses of the chamber with temperature sensors. The axial traverses resulted in temperature variations of less than 1° over a length of 4½″. No detectable variation was observed in the lateral traverse. These tests were executed at several temperatures ranging from 6° K. to 50° K.

An additional feature of the present invention is that the minimum temperature achievable with a given refrigerant 20 may be lowered below the normal boiling point of the refrigerant by pumping on the vapor exhaust 27 by means of a pump 31. By lowering the pressure in the chamber 18 the boiling point of the refrigerant 20 is reduced. Using liquid helium as the refrigerant 20, temperatures as low as 1.04° K. have been obtained. Generally, about one-third of the liquid He in the reservoir must be pumped away with a vacuum pump to reduce the temperature of the liquid He below the lambda point of 2° K. In my apparatus this initial loss is eliminated and the sustained loss rate is lowered to one-tenth of that normally encountered. Consequently, a vacuum pump of much less capacity is required.

The steps in the method of my invention are illustrated more specifically in FIGURE 2. As pointed out above, I first place the body 12 in an insulated chamber (28). I then establish a rate of flow of liquid refrigerant through a diffuser to vaporize it (29). These vapors are temperature controlled and then flowed over the body (30). By establishing a selected rate of flow of a refrigerant into a temperature controlled diffuser I overcome many of the significant deficiencies of prior art techniques. As noted above, I economize on the refrigerant, I provide a system in which the temperature may be rapidly and accurately controlled and I can remove or replace the sample without significant loss of refrigerant or time. Actually, a new sample can be inserted, cooled to 4.2° K. and then warmed through the entire temperature range of the device in a matter of minutes. This enables the very rapid accumulation of data at various temperatures on each sample.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method of accurately controlling the temperature of a body which comprises:
   (A) placing the body in a thermally insulated chamber;
   (B) establishing a selected rate of flow of a liquid cryogenic refrigerant through a heat exchanger and diffuser to permit vaporization of the liquid in the diffuser, controlling the temperature of the gas exiting from the heat exchanger by heating means associated with the heat exchanger; and
   (C) flowing the temperature controlled gas continuously over said body.

2. Apparatus for accurately controlling the temperature of a body, said apparatus comprising
   (A) a thermally-insulated first chamber for receiving said body,
   (B) a source of liquid refrigerant,
   (C) a diffuser-heat exchanger connected to receive refrigerant from said source and to discharge into said chamber a gas resulting from vaporization of the liquid refrigerant, whereby said refrigerant flows over said body and through said chamber, said diffuser-heat exchanger being arranged to provide a uniform temperature profile in the gaseous stream issuing therefrom,
   (D) a heating element arranged to heat said refrigerant before it exits from said diffuser-heat exchanger, and
   (E) means for regulating the flow of said refrigerant to said diffuser-heat exchanger.

3. The apparatus of claim 2 including:
   (A) a second chamber surrounding said first chamber and separated therefrom by a vacuum barrier, said second chamber containing said liquid refrigerant, and
   (B) a third chamber surrounding said second chamber and separated therefrom by a vacuum barrier, said third chamber containing a further refrigerant having a higher temperature than said liquid refrigerant.

4. The apparatus of claim 3 wherein said diffuser is sintered porous metal temperature controlled by electric heating coils.

5. The apparatus of claim 3 including vacuum pumping means connected to said chamber for receiving said body whereby the reduction in pressure resulting from partial evacuation of said chamber reduces the temperature of said liquid refrigerant and thus enables the maintenance of said body at a lower temperature.

6. The apparatus of claim 5 wherein said refrigerant is helium.

References Cited

UNITED STATES PATENTS

| | | | |
|---|---|---|---|
| 2,448,315 | 8/1948 | Kunzog | 62—511 X |
| 3,186,480 | 6/1965 | Sauer | 62—514 X |
| 3,216,210 | 11/1965 | Klipping | 62—514 X |
| 3,227,207 | 1/1966 | Litman | 165—30 X |
| 3,261,180 | 7/1966 | Porter et al. | 62—514 |
| 3,306,060 | 2/1967 | Klipping | 62—55 |

ROBERT A. O'LEARY, *Primary Examiner.*

W. E. WAYNER, *Assistant Examiner.*

U.S. Cl. X.R.

62—514, 62, 259; 165—30